Patented July 11, 1950

2,514,549

UNITED STATES PATENT OFFICE 2,514,549

PRODUCTION OF AMINO-ACIDS AND INTERMEDIATES THEREFOR

James Lincoln, London, England, assignor to Celanese Corporation of America, a corporation of Delaware No Drawing. Application December 10, 1946, Serial No. 715,333. In Great Britain December 18, 1945

10 Claims. (Cl. 260—482)

This invention relates to improvements in the production of amino-acids and of intermediates therefor.

The preparation of amino-acids containing amino groups separated from the carboxyl groups by more than one carbon atom has hitherto frequently presented difficulty, although various methods have been proposed. I have now found that such acids may be produced simply and in good yields by hydrogenating esters of cyano-acids in the presence of an ester of formic acid, and hydrolysing the resulting esters of formyl-amino-acids. The formyl radicle present in the intermediate products is found to protect the newly-formed amino groups from reaction under the hydrogenating conditions with the ester groups present in the amino-acid esters.

The process of the invention is of particular importance when applied to the production of $\alpha\alpha$-disubstituted-$\beta$-amino-propionic acids, especially $\alpha\alpha$-dialkyl-$\beta$-amino propionic acids, which may be prepared by hydrogenating esters of disubstituted-cyanacetic acids in the presence of an ester of formic acid, and hydrolysing the resulting esters of formylamino acids. The term "disubstituted" is to be understood as including substitution of two hydrogen atoms by a single divalent radical which then forms part of a ring system.

The simplest of the $\alpha\alpha$-disubstituted-$\beta$-amino-propionic acids is amino-pivalic acid, which may be produced according to the invention from an ester of dimethyl-cyanacetic acid. Other starting materials for use in the process of the invention for the production of the $\alpha\alpha$-disubstituted-$\beta$-amino-propionic acids are, for example, esters of alkyl-, aryl- or cyclo-alkyl-substituted cyanacetic acids or of 1-cyano-cyclo-alkyl carboxylic acids, especially those in which the substituent radicals are wholly hydrocarbon. Among such substances may be mentioned esters of diethyl-, ethyl-methyl-, diphenyl- and ethyl-cyclohexyl-cyanacetic acids and of 1-cyano-cyclo-butane- and 1-cyanocyclopropane carboxylic acids.

The process of the invention may also be applied to esters of other cyano-acids, such as, for example, those of cyanacetic acid to yield $\beta$-alanine, of $\gamma$-cyanobutyric acid to yield $\delta$-amino-valeric acid, and of $\alpha$-methyl-$\gamma$-cyanobutyric acid to yield $\delta$-amino-$\alpha$-methyl-valeric acid.

While it is generally preferred to employ the ethyl esters of the various cyano-acids, it is to be understood that esters with other saturated alcohols, particularly other lower aliphatic alcohols, or with phenols may be employed if desired.

Hydrogenation is advantageously carried out in the ester of formic acid as sole reaction medium, but diluents, e. g. low boiling paraffins, methanol, ethanol or dioxane, may be employed providing that there is present in the reaction mass at least one molecular equivalent of the ester of formic acid for each cyano group to be reduced. Preferably ethyl formate is employed as the ester of formic acid, but this may be replaced wholly or in part by other esters of formic acid, preferably lower alkyl formates, e. g. methyl formate. It is advantageous to employ the formate of the same alcohol as that of the ester of the cyano-acid which is to be hydrogenated. Very suitable catalysts for the hydrogenation are Raney nickel and Raney cobalt, and with such catalysts hydrogenation is preferably carried out at elevated temperature, e. g. about 60-100 or 120° C., under a hydrogen pressure up to 2000–3000 pounds per square inch.

The esters of the formyl-amino acids may be isolated from the reaction mixture by filtration from catalyst and distillation to separate excess of formic acid, alcohol, phenol, diluents or other compounds present.

The desired amino-acids may be obtained from the intermediate esters of formyl-amino acids, which have preferably been isolated from their production medium, by hydrolysis, e. g. by refluxing with baryta water or other mild alkali and subsequent treatment with acid to separate the free amino-acid, or by refluxing with dilute inorganic acid and subsequent extraction.

The only previously recorded preparation of amino-pivalic acid involves the long and complicated synthesis of brom-trimethyl-acetic acid and the conversion of the latter substance by replacement of the bromine atom by an amino group. The amino-pivalic acid produced by that method is described as a material which becomes brown at 200° C. and which decomposes at 220° C. (Monats. 28, 1058). I have found that, by the novel method of production according to the present invention, a product may be obtained which, without special purification, melts at above 235° C., and which, on washing, melts at about 240° C., and on analysis gives excellent agreement with theoretical values. The case is similar with other amino-acids prepared according to the invention. The high purity of the products obtained may be attributed in large measure, I believe, to the substantial lack of formation of secondary amino compounds in the conversion of the cyano-esters to the amino compounds. Products having this high degree of purity are of particular value in the production of polyamides, and the αα-disubstituted-β-amino-propionic acids produced according to the invention are particularly suitable for use in accordance with the process of my U. S. application S. No. 652,237, filed March 5, 1946, by virtue of their purity.

The following example illustrates the invention:

*Example*

25 parts by weight of the ethyl ester of dimethyl-cyanacetic acid were heated with 47 parts of ethyl formate and about 3 parts of Raney nickel in an autoclave at 100° C. under a hydrogen pressure of 1400 pounds per square inch. The whole was agitated until substantially the theoretical absorption of hydrogen had occurred, when the Raney nickel was filtered off, the excess ethyl formate and alcohol removed by distillation, and the product distilled to yield a somewhat viscous liquid boiling at 127° C., at 1.4 mm. and having a refractive index of 1.4525 at 18° C. Analysis confirmed that this product was the ethyl ester of αα-dimethyl-β-formyl-α-amino-propionic acid.

2 parts of the ethyl ester of dimethyl-formyl-amino-propionic acid produced as above were hydrolysed by refluxing for 4 hours with 50 parts of water containing 6 parts of hydrated barium hydroxide. The barium was then removed quantitatively by precipitating with sulphuric acid and the aqueous liquor evaporated almost to dryness under reduced pressure. Addition of 50:50 alcohol-ether mixture precipitated white crystals of amino-pivalic acid which were washed with ether and dried. The product melted at 239–241° C. and gave the following analytical figures:

Found: C, 51.41; H, 9.47; N, 11.90%. Required for $C_5H_{11}O_2N$: C, 51.24; H, 9.46; N, 11.88%.

Having described my invention, what I desire to secure by Letters Patent is:

1. Process for the production of esters of formyl-amino acids, in which the formyl-amino groups are separated from the esterified carboxyl groups by more than one carbon atom, which comprises hydrogenating esters of cyano-acids in the presence of an ester of formic acid at a temperature of 60 to 120° C. under a super-atmospheric pressure of hydrogen, using a catalyst selected from the group which consists of Raney nickel and Raney cobalt.

2. Process for the production of esters of β-formyl-amino acids, in which the α-carbon atoms carry two substituent radicles, which comprises hydrogenating esters of α-cyano-acids, in which the α-carbon atoms carry two substituent radicles, in the presence of an ester of formic acid at a temperature of 60 to 120° C. under a super-atmospheric pressure of hydrogen, using a catalyst selected from the group which consists of Raney nickel and Raney cobalt.

3. Process for the production of esters of αα-dialkyl-β-formylamino-propionic acids, which comprises hydrogenating an ester of a dialkyl-cyanacetic acid in the presence of an ester of formic acid at a temperature of 60 to 120° C. under a super-atmospheric pressure of hydrogen, using a catalyst selected from the group which consists of Raney nickel and Raney cobalt.

4. Process for the production of esters of αα - dimethyl - β - formylamino-propionic acids, which comprises hydrogenating an ester of a dimethyl-cyanacetic acid in the presence of an ester of formic acid at a temperature of 60 to 120° C. under a super-atmospheric pressure of hydrogen, using a catalyst selected from the group which consists of Raney nickel and Raney cobalt.

5. Process for the production of esters of formyl-amino acids, in which the formyl-amino groups are separated from the esterified carboxyl groups by more than one carbon atom, which comprises hydrogenating esters of cyano-acids in the presence of an ester of formic acid as the reaction medium at a temperature of 60 to 120° C. under a super-atmospheric pressure of hydrogen, using a catalyst selected from the group which consists of Raney nickel and Raney cobalt.

6. Process for the production of esters of αα-dialkyl-β-formylamino-propionic acids, which comprises hydrogenating an ester of a dialkyl-cyanacetic acid in the presence of an ester of formic acid as the reaction medium at a temperature of 60 to 120° C. under a super-atmospheric pressure of hydrogen, using a catalyst selected from the group which consists of Raney nickel and Raney cobalt.

7. Process for the production of ethyl esters of formyl-amino acids, in which the formyl-amino groups are separated from the esterified carboxyl groups by more than one carbon atom, which comprises hydrogenating ethyl esters of cyano-acids in the presence of ethyl formate as the reaction medium at a temperature of 60 to 120° C. under a super-atmospheric pressure of hydrogen, using a catalyst selected from the group which consists of Raney nickel and Raney cobalt.

8. Process for the production of ethyl esters of αα-dialkyl-β-formylamino-propionic acids, which comprises hydrogenating an ethyl ester of a dialkyl-cyanacetic acid in the presence of ethyl formate as the reaction medium at a temperature of 60 to 120° C. under a super-atmospheric pressure of hydrogen, using a catalyst selected from the group which consists of Raney nickel and Raney cobalt.

9. As a new substance, formylamino-pivalic acid.

10. As a new substance, the ethyl ester of formylamino-pivalic acid.

JAMES LINCOLN.

REFERENCES CITED

The following references are of record in the file of this patent:

UNITED STATES PATENTS

| Number | Name | Date |
| --- | --- | --- |
| 2,394,230 | Billman | Feb. 5, 1946 |

FOREIGN PATENTS

| Number | Country | Date |
| --- | --- | --- |
| 597,305 | Germany | July 24, 1931 |

OTHER REFERENCES

Weygand, Ber. Deut. Chem., vol. 74, pp. 256–257. (1941).

Certificate of Correction

Patent No. 2,514,549                               July 11, 1950

JAMES LINCOLN

It is hereby certified that error appears in the printed specification of the above numbered patent requiring correction as follows:

Column 3, line 26, for "formyl-$\alpha$-amino-" read *formyl-amino-*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*